United States Patent
Brewin et al.

(10) Patent No.: US 8,287,982 B2
(45) Date of Patent: Oct. 16, 2012

(54) IMPREGNATED FABRIC

(75) Inventors: Peter Brewin, Glamorgan (GB);
William Crawford, Glamorgan (GB)

(73) Assignee: Concrete Canvas Limited, Glamorgan (GB)

( * ) Notice: Subject to any disclaimer, the term of this patent is extended or adjusted under 35 U.S.C. 154(b) by 774 days.

(21) Appl. No.: 12/303,864

(22) PCT Filed: May 14, 2007

(86) PCT No.: PCT/GB2007/001795
§ 371 (c)(1),
(2), (4) Date: Dec. 18, 2008

(87) PCT Pub. No.: WO2007/144559
PCT Pub. Date: Dec. 21, 2007

(65) Prior Publication Data
US 2010/0233417 A1  Sep. 16, 2010

(30) Foreign Application Priority Data
Jun. 12, 2006 (EP) .................................. 06253025

(51) Int. Cl.
*B32B 5/02* (2006.01)
*B32B 38/08* (2006.01)
*B05D 7/22* (2006.01)

(52) U.S. Cl. ...... 428/86; 428/87; 428/306.6; 428/312.2; 427/181; 156/279

(58) Field of Classification Search .................. 428/86, 428/87, 304.4, 305.5, 306.6, 312.2, 312.4, 428/68, 70, 72; 427/181, 230, 238; 442/318; 156/279
See application file for complete search history.

(56) References Cited

U.S. PATENT DOCUMENTS

| | | | | |
|---|---|---|---|---|
| 3,373,741 A * | 3/1968 | Hill et al. | ........................... | 602/8 |
| 3,900,024 A * | 8/1975 | Lauber et al. | ..................... | 602/8 |
| 4,235,228 A * | 11/1980 | Gaylord et al. | .................... | 602/8 |
| 4,495,235 A * | 1/1985 | Tesch | ............................ | 428/137 |
| 5,041,330 A * | 8/1991 | Heerten et al. | ................ | 428/213 |
| 5,112,665 A * | 5/1992 | Alexander | .................... | 428/102 |
| 5,346,566 A * | 9/1994 | White | ............................ | 156/71 |
| 5,461,885 A | 10/1995 | Yokoyama et al. | | |
| 5,589,245 A | 12/1996 | Roell | | |
| 6,156,406 A * | 12/2000 | Rock et al. | ...................... | 428/86 |
| 6,461,317 B1 * | 10/2002 | Grim et al. | ........................ | 602/8 |

(Continued)

FOREIGN PATENT DOCUMENTS

DE  9016062 U1  2/1991

(Continued)

OTHER PUBLICATIONS

International Search Report for PCT/GB2007/001795.

*Primary Examiner* — Cheryl Juska
(74) *Attorney, Agent, or Firm* — Brooks Kushman P.C.

(57) ABSTRACT

The invention provides a knitted spacer fabric having a tightly knitted bottom layer, a more loosely knitted upper layer and pile yarns extending across the space between the lower and upper faces. Settable material, is introduced into the space between the upper and lower faces and can be caused to set by the addition of a liquid. Until set, the fabric is flexible and can be shaped but after the material in space has set, the fabric is rigid and can be used as a structural element in a wide range of situations.

16 Claims, 2 Drawing Sheets

U.S. PATENT DOCUMENTS

| | | | |
|---|---|---|---|
| 6,477,865 B1* | 11/2002 | Matsumoto | 66/195 |
| 6,630,414 B1* | 10/2003 | Matsumoto | 442/1 |
| 7,465,283 B2* | 12/2008 | Grim et al. | 602/8 |
| 7,552,604 B1* | 6/2009 | Waldrop et al. | 66/195 |
| 7,607,730 B2* | 10/2009 | Moseneder | 297/218.3 |
| 7,611,999 B2* | 11/2009 | McMurray | 442/304 |
| 7,721,749 B2* | 5/2010 | Brewin et al. | 135/137 |
| 7,762,970 B2* | 7/2010 | Henderson et al. | 602/8 |
| 7,849,715 B2* | 12/2010 | Starbuck et al. | 66/171 |
| 7,937,973 B2* | 5/2011 | Sorensen et al. | 66/196 |
| 7,960,603 B2* | 6/2011 | Evans | 602/44 |
| 2003/0077965 A1 | 4/2003 | Mack et al. | |
| 2004/0097151 A1* | 5/2004 | McMurray | 442/304 |
| 2006/0155223 A1* | 7/2006 | Koch | 601/99 |
| 2007/0238392 A1* | 10/2007 | Starbuck et al. | 450/1 |
| 2008/0017229 A1* | 1/2008 | Brewin et al. | 135/87 |
| 2008/0287852 A1* | 11/2008 | Evans | 602/43 |

FOREIGN PATENT DOCUMENTS

| | | |
|---|---|---|
| DE | 9105132 U1 | 6/1991 |
| EP | 0071209 A2 | 2/1983 |
| JP | 04327272 A | 11/1992 |
| JP | 06018099 A * | 1/1994 |
| JP | 08049143 A * | 2/1996 |
| WO | 2005/124063 A2 | 12/2005 |

* cited by examiner

IMPREGNATED FABRIC

TECHNICAL FIELD

The present invention relates to a fabric impregnated with a material that, when mixed with a liquid, will set. Such fabric has numerous applications.

TECHNICAL BACKGROUND

WO 2005/124063 describes a shelter that includes a ground sheet and a cover; the space between the ground sheet and the cover can be inflated by pumping air into the space to raise the cover and form the shelter. The cover is made of a fabric that has been impregnated with cement; the fabric may be a type of felt known as "wadding", which is a loose non-woven fabric. Immediately before the interior space is inflated, the cover is wetted with water, so that, after inflation, the cement in the cover sets and forms a rigid shell that acts as a self-supporting roof for the shelter, which is particularly useful in providing temporary accommodation in emergency areas.

Spacer fabric is a known material and comprises a top face layer, a bottom face layer and pile yarns extending between the two faces. It is commercially available, for example from Culzean fabrics of Kilmarnock, United Kingdom; Scott and Fyfe of Tayport, Fife, United Kingdom and W Bull and Son Ltd (Baltex) of Ilkestone, United Kingdom. It is used to manufacture garments and other articles where the fabric must be thick but light and/or where the fabric should include an air gap, for example in cycle helmets, boot soles, fireman's clothing, body armour; mattresses and bandages; climate-control seating in vehicles. The pile yarns are self-supporting to space the two faces apart by a desired distance and to resist crushing forces, i.e. forces acting perpendicular to the plane of the faces. The thickness of the spacer fabric is determined during manufacture by choosing an appropriate length for the pile yarn. The yarns used for forming the two faces can be the same or different from each other and from the pile yarns so that it is possible to choose the properties of the two face layers and of the pile to provide the desired properties. Among the fibres employed are polyethylene, polyester, Nomex, Kevlar, polyamide and microfibre (Nomex and Kevlar are trademarks).

JP-A-04327272 discloses a woven or knitted lattice-like fibre sheet to which is applied a composition containing all the components of a thermosetting resin, and containing a large proportion of plasticizer. The resin composition is cured to provide a sheet having high flexibility, high strength, low elongation and good shape stability. Because of the high amount of plasticizer in the resin, the resin is flexible and so allows the sheet to be wound up on a roll.

U.S. Pat. No. 5,461,885 describes a hardenable substrate that is used for forming casts and splints for immobilising patients' limbs and joints that have been fractured, broken or strained. The substrate is formed of a fabric having two spaced-apart webs; a hardenable liquid composition is drawn into the space between the webs by capillary action and allowed to set. The liquid composition may be a resin or a liquid dispersion of plaster of Paris. The hardenable liquid sets in situ shortly after it has been added to the fabric.

US 2003/0077965 discloses the use of a spacer fabric in a resin infusion process or a resin transfer moulding process in which liquid resin is introduced into the fabric and allowed to cure/harden.

DISCLOSURE OF INVENTION

According to the present invention, there is provided a fabric comprising:

a first face;

a second face separated from the first face by space;

self-supporting pile yarns extending between the first and second faces that maintain the first and second face in a spaced-apart arrangement; and a solid powder material, located in the space between the first and second faces, which material is capable of setting to a rigid or semi-rigid solid mass on the addition of a liquid or on exposure to radiation, e.g. UV radiation.

The settable powder material may be settable on the addition of water and in one embodiment may comprise cement, optionally together with sand or fine aggregates and/or plasticizers and other additives found in cement or concrete compositions, that will set to solid cement or concrete on the addition of water or a water-based solution. Alternatively, the settable material may be a UV settable material or one component of a multi-part curable resin that cures when two or more liquid components are mixed together, e.g. an epoxy resin system.

The amount of settable material in the space in the fabric is preferably such that, particularly when the material has set, it occupies substantially the whole of the space between the first and second faces.

The settable powder material can be easily loaded into the fabric and, in the case that it is hardened by the addition of a liquid, the liquid can rapidly penetrate between the powder particles to form a composition that will set over time.

The settable powder material and/or the liquid can include additives e.g. flexiblizers, foaming agents, fillers, reinforcement materials etc. that are known in the art in connection with the settable materials concerned.

The first and the second faces may be formed of yarns and the yarns of the two faces may be the same as each other or different.

The settable material is preferably added to the space through pores formed in the first face of the fabric, in which case, the first face will have pores that are large enough to allow the material to be placed in the fabric. However, after the material has been placed in the fabric, it is desirable to prevent it falling out through the first face and several techniques can be applied to achieve this aim.

Firstly, a further layer may be bonded onto the first face after the settable material has been introduced into the fabric. This further layer may be permeable to the liquid used to cause the settable material to set and, if the permeability is brought about by the presence of pores in the bonded layer, such pores should be sufficiently small to prevent the settable materials from falling through the first face material. Any suitable layer may be used to seal the first face, e.g. a PVC layer, which can be secured to the upper face by a variety of techniques, for example by thermal welding or by means of an adhesive. Alternatively the layer may be formed of a curable paste which is subsequently cured, e.g. using heat. Such a layer is preferably thin, typically less than or equal to 0.5 mm. The layer may be flexible to maintain the flexibility of the overall fabric prior to setting. Additional layers may be applied to the sealing layer by a variety of techniques, for example by thermal or chemical welding or by means of an adhesive. One such layer could by way of example be a damp-proof layer for applications, which could find application in the construction industry or tunnelling.

Secondly, the first face may be made of, or include, an elastomeric yarn so that the upper face can be stretched to enlarge pores within the face to allow the settable material to be introduced into the fabric but, once the material has been added to the fabric, the stretching forces can be released, to close the pores to a size such that the settable material cannot readily escape through the first face.

Thirdly, the first face can be treated after the settable material has been introduced into the fabric to close the pores of the first face. For example, it is possible to treat the first face by applying a sealing material such as an adhesive or to subject the first face to solvent treatment to fully or partially close the pores. In one example, a PVC paste may be applied (for example using a scraper) to the first face and cured for example by heat, e.g. by means of radiative heaters or hot air blowers.

Fourthly, the first face can be knitted from a fibres that will shrink when heated, thereby enabling the settable materials to be introduced through a knit having pores sufficiently open to allow the particles to pass through; after the particles of the settable material have been introduced into the fabric, the first face can be heated, e.g. using heated air, and the heat will cause the fibres to contract sufficiently to close the pores enough as to substantially prevent the particles of settable materials from escaping. Such fibres that shrink when heated include the majority of thermoplastic fibres for example polypropylene. The method of heating fibres to cause shrinkage described above may also have an advantage in compacting the settable material especially if such heat shrinkable fibres are also used to form the second face and/or the pile yarns.

The second face is preferably substantially impervious to the settable material so that the settable material does not fall through the second face when added through the first face. However, in order to assist in the penetration of liquid into the space, the second face is preferably porous to the liquid applied to set the material. Thus, the second face preferably includes pores having a size allowing the liquid to penetrate but not allowing material particles to pass through. If nevertheless the second sheet has pores that are too large to retain the material within the space, it is possible to prevent the material falling out through the second face using any of the measures discussed above.

As already mentioned, the second and in some cases the first face of the fabric may be such that the liquid can penetrate into the space through the faces to contact the settable powder material within the space. Such liquid penetration can take place either by including pores within the face (as discussed above) and/or by making the yarns of the first and second faces of a material that can be wetted by the liquid concerned and therefore the liquid will be wicked through the first and second faces to come into contact with the settable material within the fabric. Furthermore, capillary action between fibres within the first and second faces can assist in providing liquid to the settable material.

Suitable materials for use in forming the first and second faces include:
  polypropylene, which is the preferred material to use when the settable material includes cement, as it has excellent chemical resistance to alkaline conditions;
  coated glass fibres, which can provide reinforcement to the set material;
  polyethylene;
  PVC fibres, which have the advantage of being relatively easy to bond using chemical or thermal bonding.
  A mixture of fibres can be used.

The length of the pile yarns controls the spacing between the first and second faces and, as described above, they must be self-supporting. They should be sufficiently stiff, i.e. they should be sufficiently resistant to bending under forces tending to crush the fabric, to maintain the spacing between the faces when the settable material has been loaded onto the first face to feed the material into the fabric. The density of the pile yarns, i.e. the number of yarns per unit area, is also an important factor in resisting crushing forces while the material particles are being added and so maintaining the spacing between the faces and in restricting the movement of the material particles once they are trapped between the upper and lower layers.

It is important, in accordance with the present invention, that the pile yarn does not divide the space within the fabric into individual small closed compartments since such a division would allow cracks to propagate within the fabric and so reduce the strength of the fabric once the material has set.

The particle size of the settable material must be sufficient to allow it to be introduced into the fabric but it should not be so fine as to fall out of pores in the first and/or second faces. Especially preferred are high alumina cements since they provide shorter setting times than other cements.

The first and second faces and the pile yarn are preferably part of a spacer fabric, which can be formed with pores in the first and second faces by the knitting process used to make it. The second face is preferably more tightly knitted than the first face so that the pores in the second face are smaller than in the first face to allow the settable powder material to be introduced into the space through the relatively large pores in the first face and prevent the material falling out of the fabric through the second face.

The fabric of the present has the advantage that it can be manufactured and caused to set at will any time later by the addition of the liquid, e.g. water. The fabric can therefore be made at one location, transported to another location, where it is caused to set by the addition of the liquid, which can be supplied locally, thereby reducing the bulk that must be transported. The fabric impregnated with the solid powder will still be flexible and can be folded or rolled up for transport.

The fabric of the present application has many applications. Firstly, it can be used to form the cover of a prefabricated shelter as described in WO 2005/124063. However, it has wider applications and, for example, can be used:
  to form a track-way for vehicles, pedestrians or animals;
  to form a shelter by applying the fabric to a framework;
  to make formwork for casting concrete;
  to form barriers, e.g. to line tunnels;
  to repair or reinforce structures, e.g. roofs;
  to form floors or damp proof structures;
  to reinforce earth structures, e.g. river banks and unstable slopes;
  to provide flood defences;
  to repair existing pipes, including buried water pipes or to construct new pipes;
  to fireproof elements of new or existing structures e.g. as a fireproof covering or lining for chimneys;
  to form a hard surface, reduce dust hazards and contain fuel spills for aircraft e.g. helicopter landing sites and runways;
  to reinforce sandbag structures and protect them from ultra violet degradation and damage from the elements such as wind and ultra violet degradation;
  to line ground works and prevent the leaching of chemical contaminants eg. for land fill or secondary fuel containment works;
  to form a waterproof lining for the containment of water e.g. pond, canal lining and water storage or septic tanks;
  to form permanent awnings or roof structures;
  to form artistic or decorative forms, or
  to form hulls and superstructure of floating vessels such as boats or pontoons.

If the settable material is set by the addition of water, the water can be added deliberately or the fabric can be put in a place where it will come into contact with water, e.g. in a watercourse or outside where it can absorb rain. For example, it is possible to bury the fabric in damp earth and allow it to absorb water from the earth, thereby causing the settable material to set.

Once the material has set, the pile yarns also provide reinforcement to the set material and substantially increase its strength.

A substantial advantage of the fabric is that the pile yarns and the fibres of the first and second faces provide reinforcement to the material once it has set and accordingly increase the physical properties of the set material, as discussed more extensively below.

There is theoretically no limit to the thickness of the fabric, although it will generally be limited by the manufacturing techniques used to produce it. A typical thickness would be between 2 and 70 mm, e.g. from 2 to 40 mm, and typically between 4 and 30 mm, e.g. from 4 to 20 mm. One important consideration limiting the thickness of the material is the ability of the liquid to penetrate through the interior of the settable material before the outer portions of the settable material is set. A further limitation on the thickness comes from the increased weight of the fabric with increased thickness and if it is too thick, the faces may not be able to support the weight of the settable material within the fabric.

BRIEF DESCRIPTION OF DRAWINGS

There will now be described, by way of example only, a fabric material in accordance with the present invention, by reference to the accompanying drawings in which.

DETAILED DESCRIPTION OF THE BEST MODE FOR PUTTING THE INVENTION INTO OPERATION

Figure 1:
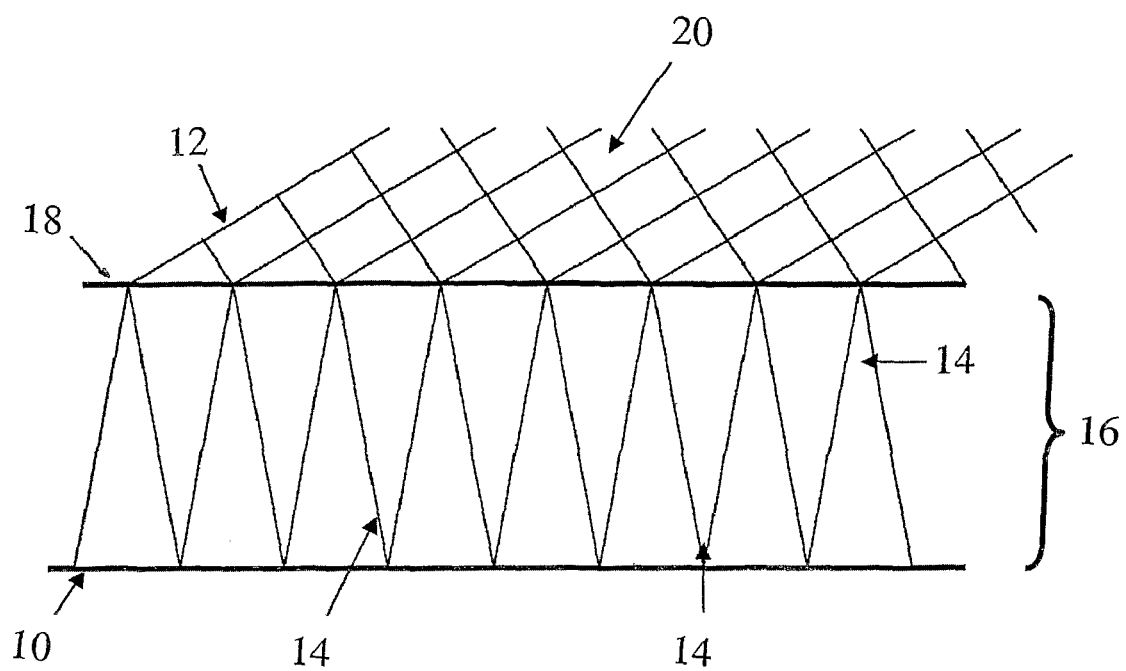
FIG. 1 is a cross sectional view through a spacer fabric.

Referring to the accompanying drawings, FIG. 1 shows a knitted spacer fabric having a tightly knitted bottom face layer 10, a more loosely knitted upper face layer 12 and pile yarns 14 extending across the space 16 between the lower and upper face layers 10, 12. The spacer fabric is made of knitted polyethylene and is commercially available from Scott & Fyfe as 5 mm spacer fabric.

Settable material, e.g. cement, is introduced into the fabric through pores 20 in the open-knit upper face layer 12. The pores 20 arise through the knitting process during manufacture of the spacer fabric. The cement can be placed on the spacer fabric and will fall through pores 20 into space 16. The penetration through the pores 20 can be assisted through vibration. It is preferred that the whole of the space 16 is filled with cement in this way. Vibration also has the advantage of settling the cement within the space 16 to prevent voids or air pockets being formed. Additionally, the settable material can be drawn into space 16 by resting the spacer fabric on a porous surface and applying suction through the porous surface to form a pressure drop across the spacer fabric, which assists in the compaction of the settable material within the spacer fabric and reduces the instances and size of residual voids and air pockets. Additionally, compaction of the settable material within the space 16 may be further increased by vibration of a heavy plate resting on the spacer fabric containing the settable material.

The bottom face 10 has a relatively tight knitted structure and the size of the pores in the bottom face are smaller than in the upper face layer such that the pores are sufficiently small to prevent substantial amounts of the cement from falling out.

After the material has been introduced into the space 16, the upper face layer 12 is sealed by the application of a thin coat of PVC paste which is then cured by heating the surface.

Water can penetrate into the fabric through the pores in the bottom face 10; hydration of the cement is aided by the pile yarns 14, which can wick water into the interior of the fabric.

The fabric including the settable material within the space 16 is flexible and can be formed to shape prior to the introduction of liquid to set the material within the space.

The long fibres 18, together with the shorter fibres in the fabric, provide reinforcement to the material, when set and prevent crack propagation.

Example 1

Three test pieces of fabric in accordance with the present invention having a surface area of 725 mm$^2$ were produced by introducing high alumina cement into a spacer fabric, the spacer fabric was a polyethylene knitted fabric manufactured by Scott and Fyfe being 5 mm thick. The fabric was then sprayed with water and allowed to set for 4 days. The test pieces were then subjected to the following test: the test pieces were each placed in an Instron—5584-52536 Universal Materials Testing Machine having a movable anvil that can apply compressive forces to the test piece. Each test pieces was loaded so that the anvil acts perpendicularly to the knitted faces. A load cell measures the compressive load and the displacement of the anvil. The compressive load was progressively increased until the test piece failed and the load exerted on the test piece and the displacement of the anvil at failure were logged by a computer connected to the machine. The procedure was repeated four times using separate samples.

Figure 2:
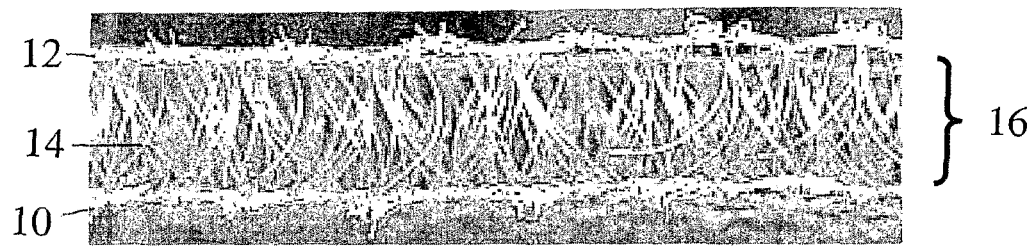
FIG. 2 is a diagrammatic illustration of the fabric.
Figure 3:
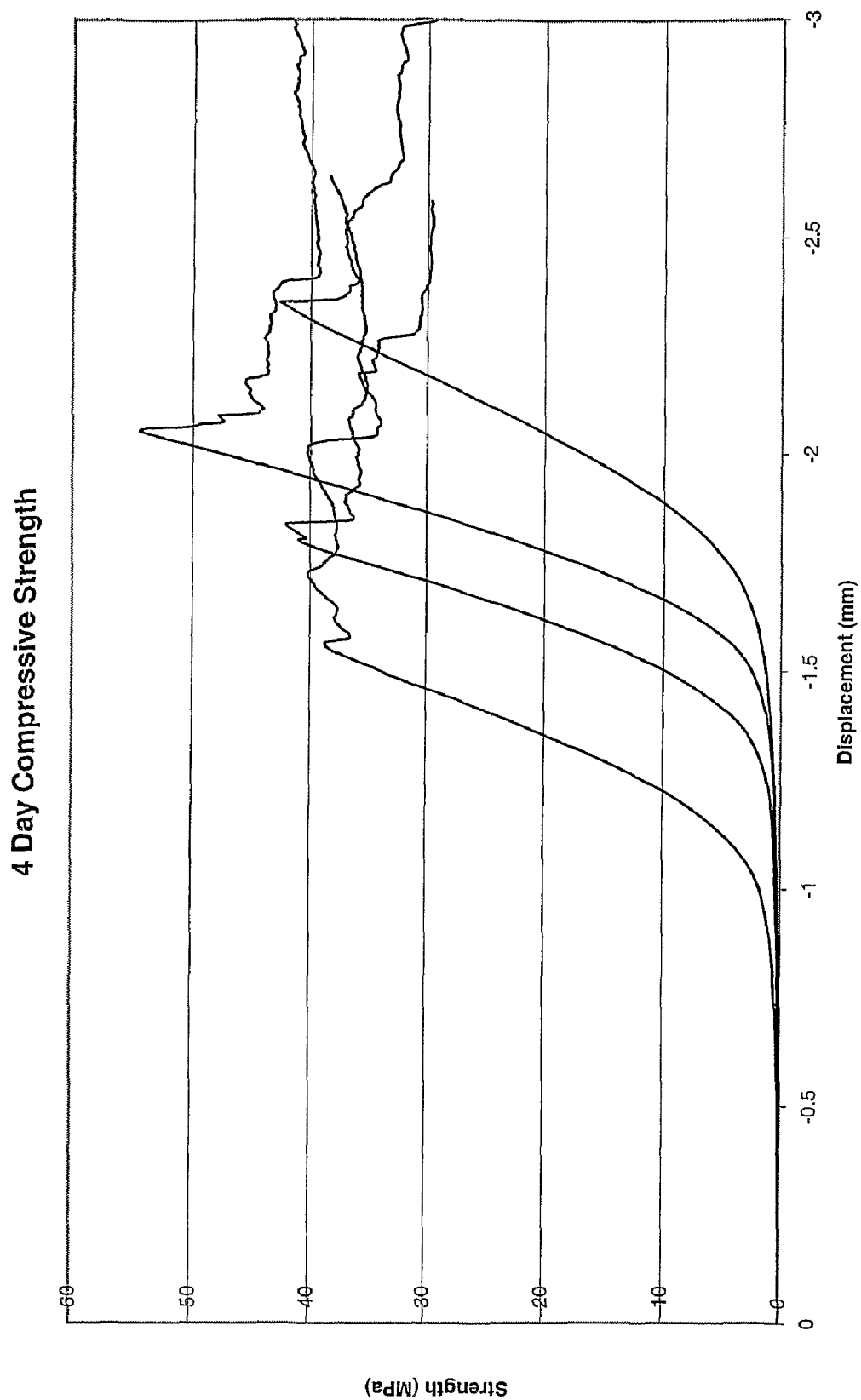
FIG. 3 is a graph showing the strength of the fabric under a load.

The results are shown in FIG. 2, from which can be seen that the four test pieces of fabric material in accordance with the present invention failed at a consistently high compressive load and that once initial failure had occurred, when cracking could be observed in the samples, the samples did not fail catastrophically but continued to support a consistently high compressive load as the displacement was increased progressively.

The invention claimed is:

1. A flexible fabric that can be set to become rigid or semi-rigid, the fabric comprising:
   a first face having a yarn and pores;
   a second face also having a yarn and pores, the second face being separated from the first face by a space;
   self-supporting pile yarns extending between the first and second faces that maintain the first and second face in a spaced-apart arrangement; and
   a powder material comprising a cement located in the space between the first and second faces, the powder material being capable of setting to a rigid or semi-rigid solid on the addition of a liquid wherein the pores of the first face are at least partly sealed or have been reduced in size by an applied sealant, such that the size of any partly sealed pores of the first face is sufficiently small as to retain the powder material within the space, the second face includes pores that are sufficiently small as to retain the powder material within the space but allow the passage of the liquid causing the powder material to set.

2. The fabric of claim 1, wherein the cement is selected from the group consisting of a cement-based dry concrete mix including plasticizers and at least one additive, a component of a multi-part curable resin, and an ultra violet radiation curable resin.

3. The fabric of claim 1, wherein the yarn of at least one of the first face, the second face and the pile yarns comprises a heat shrinkable yarn so that the internal volume between the first and second face can be reduced by heating to compact the powder material.

4. The fabric of claim 1, wherein the sealant is an adhesive or a heat curable material.

5. The fabric of claim 1, wherein the first face is backed by a damp proof layer being impervious to liquids or gases.

6. The fabric of claim 1, wherein said cement is set cement.

7. The fabric of claim 1, wherein the pores in the second face are adapted to retain a portion of the cement within the space in combination with allowing the water to pass through the second face.

8. A method of use of a flexible fabric, the method comprising the steps of:
providing the flexible fabric of claim 1;
applying a liquid to the second face;
passing the liquid through the second face into the space having the powder material;
reacting the liquid with the powder material to begin setting the solid;
forming the combination of flexible fabric, powder material, and liquid, before the solid is set, into a useful structure selected from the group consisting of a cover of a shelter, a track-way, a form for casting concrete, a barrier, a liner for a tunnel, a repaired structure, a reinforced structure, a floor, a damp proof structure, a reinforced earth structure, a flood defense, a pipe repair, a pipe, a fireproof structure, a dust suppressor, a fuel spill suppressor, a sandbag structure reinforcement, an ultraviolet light degradation protection structure, a wind-damage protection structure, a ground works liner, a chemical leaching contaminant containment structure, a waterproof lining of a water containment structure, a permanent awning, a roof structure, an artistic form, a hull, and a boat superstructure; and
setting completely the solid.

9. A method of making an impregnated flexible fabric that can be set to become rigid or semi-rigid, the method comprising:
providing a fabric having a first face having pores, a second face also having pores separated from the first face by a space and self-supporting pile yarns extending between the first and second faces and that maintain the first and second face in a spaced-apart arrangement; and
loading the space within the fabric with a powder material comprising cement that is capable of setting to a rigid or semi-rigid solid on the addition of a liquid through the pores in at least one of the first face and the second face; and
reducing the size of the pores or closing the pores in the first face once the powder material has been loaded by partly or completely sealing the pores by applying a sealant to the first face such that the size of the at least partly sealed pores of the first face being sufficiently small as to retain the powder material within the space, wherein the pores in the second face are sufficiently small as to retain the powder material within the space but allow the passage of the liquid to cause the powder material to set.

10. The method of claim 9, which comprises applying a pressure drop across the faces through a permeable layer during the loading step or vibrating a weight on top of the loaded fabric, thereby increasing the loading of settable material in the fabric.

11. The method of claim 9, wherein the sealant is an adhesive.

12. The method of claim 9, which includes the further step of adding a liquid to the fabric to cause the settable powder material to set.

13. The method of claim 12, wherein the liquid is added at a location that is different from the location where the powder material is incorporated in the fabric.

14. The method of claim 9, wherein loading the space with the powder material includes placing the powder material on the first face; and at least one of vibrating the fabric and brushing powder material into the fabric.

15. Impregnated fabric made by the method of claim 9.

16. A method of making an impregnated flexible fabric that can be set to become rigid or semi-rigid, the method comprising the steps of:
providing a fabric having a first face having pores, a second face also having pores separated from the first face by a space and self-supporting pile yarns extending between the first and second faces and that maintain the first and second face in a spaced-apart arrangement;
loading the space within the fabric with a powder material comprising cement that is capable of setting to a rigid or semi-rigid solid on the addition of a liquid through the pores in at least one of the first face and the second face; and
reducing the size of the pores or closing the pores in the first face once the powder material has been loaded by partly or completely sealing the pores by making the first face from an elastomeric yarn so that the pores can be enlarged by stretching the first face during the loading of the powdered material and the size of the pores are reduced by releasing the stretching forces on the first face.

* * * * *